US008150849B2

(12) United States Patent
Chaudhury et al.

(10) Patent No.: US 8,150,849 B2
(45) Date of Patent: Apr. 3, 2012

(54) SYSTEM AND METHOD FOR EXTRAPOLATING DATA FROM A SAMPLE SET

(75) Inventors: Supratim Roy Chaudhury, Santa Clarita, CA (US); Christopher L. Hogan, Santa Monica, CA (US); Amitabh Seth, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 840 days.

(21) Appl. No.: 11/734,544

(22) Filed: Apr. 12, 2007

(65) Prior Publication Data

US 2008/0256018 A1 Oct. 16, 2008

(51) Int. Cl.
*G06F 7/00* (2006.01)
*G06F 17/30* (2006.01)
(52) U.S. Cl. ....................... 707/737; 705/14.4
(58) Field of Classification Search .......... 707/705, 707/736, 737; 705/14.4, 14.41, 14.42, 14.49, 705/14.52, 14.66
See application file for complete search history.

(56) References Cited

U.S. PATENT DOCUMENTS

| | | | |
|---|---|---|---|
| 5,704,017 A * | 12/1997 | Heckerman et al. | 706/12 |
| 6,466,970 B1 * | 10/2002 | Lee et al. | 709/217 |
| 6,591,248 B1 * | 7/2003 | Nakamura et al. | 705/14 |
| 6,829,561 B2 * | 12/2004 | Keller et al. | 702/179 |
| 7,050,990 B1 * | 5/2006 | Chu et al. | 705/14 |
| 7,401,130 B2 * | 7/2008 | Mason | 709/219 |
| 7,424,439 B1 * | 9/2008 | Fayyad et al. | 705/10 |
| 7,469,246 B1 * | 12/2008 | Lamping | 1/1 |
| 2002/0111847 A1 * | 8/2002 | Smith, II | 705/10 |
| 2003/0018501 A1 * | 1/2003 | Shan | 705/7 |
| 2004/0030597 A1 * | 2/2004 | Bibas | 705/14 |
| 2004/0190448 A1 * | 9/2004 | Fishteyn et al. | 370/229 |
| 2005/0071218 A1 * | 3/2005 | Lin et al. | 705/10 |
| 2005/0097204 A1 * | 5/2005 | Horowitz et al. | 709/223 |
| 2007/0027754 A1 * | 2/2007 | Collins et al. | 705/14 |
| 2007/0060136 A1 * | 3/2007 | Ramer et al. | 455/445 |
| 2007/0078707 A1 * | 4/2007 | Axe et al. | 705/14 |
| 2007/0130014 A1 * | 6/2007 | Altberg et al. | 705/14 |
| 2007/0192190 A1 * | 8/2007 | Granville | 705/14 |
| 2007/0244750 A1 * | 10/2007 | Grannan et al. | 705/14 |
| 2008/0091524 A1 * | 4/2008 | Yan et al. | 705/14 |
| 2008/0103887 A1 * | 5/2008 | Oldham et al. | 705/14 |

* cited by examiner

*Primary Examiner* — Marc Somers
(74) *Attorney, Agent, or Firm* — Seth H. Ostrow; Ostrow Kaufman LLP

(57) ABSTRACT

Embodiments of the present invention are directed to identifying a source of bias in a sample set and using statistical techniques to overcome the bias, thereby producing extrapolated data that accurately represents a population including the sample set. The method according to one embodiment comprises identifying a plurality of attributes corresponding to an entity, generating a plurality of clusters from the plurality of attributes, the plurality of clusters including varying numbers of the plurality of attributes, and performing measurements on each of the plurality of clusters to generate measurement data values for each of the plurality of clusters. A cluster with a greatest measurement data value is selected.

11 Claims, 3 Drawing Sheets

SYSTEM AND METHOD FOR EXTRAPOLATING DATA FROM A SAMPLE SET

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to extrapolating data from a sample set. More specifically, the present invention relates to identifying a source of bias in a sample set and using statistical techniques to overcome the bias, producing extrapolated data that accurately represents a population including the sample set.

BACKGROUND OF THE INVENTION

A company which implements an Internet-based advertising campaign for an advertiser may track events and compute one or more metrics to measure progress of the campaign. For example, one of the metrics may be a conversion rate, e.g., a percentage of visitors who take some action upon visiting a website, such as purchasing a product in response to the presentation of an advertisement. The action may also include, for example, a user registration, viewing a given portion of the website, downloading a file, clicking on a hyperlink, etc. If a user executes a given action, a conversion is logged. By aggregating the conversions over time, the company may compute a conversion rate of traffic coming from different avenues that the campaign is utilizng. The conversion rate can serve as an indicator of an effectiveness of the campaign, a return-on-investment ("ROI") for the advertiser and a rate other advertisers would pay for similar campaigns.

One technique that a campaign may utilize includes publishing links to the advertiser's website on related websites. For example, if the advertiser is marketing baseball equipment, the related websites may include web sites for soft drink companies, video game companies, etc. that market their goods or services to a similar market demographic as the advertiser. When a user clicks on a published link at a related web site and takes an action at the advertised web site (e.g., purchasing an advertised product), a conversion may be logged. By tracking the conversion rates of advertisements, a conversion rate may be computed for the published links to determine a value for publishing the link on the related website. However, the measured conversion rate may only be available from the advertiser's website. That is, the conversion rate can only be accurately calculated when it receives notice from the related websites of the conversions. Without the notice or the actual conversion information, a conversion rate must be estimated for an entire population of advertisers using one or more small, biased samples. Any sampling or estimation based on the biased sample, however, does not accurately represent the conversion rate across the entire population of advertisers.

Thus, there exists a need to provide systems and methods to extrapolate data from a biased sample set to estimate characteristics of a total population that includes the sample set.

SUMMARY OF THE INVENTION

A method for extrapolating data from a sample set is described. The method includes the steps of identifying a plurality of attributes corresponding to an entity; generating a plurality of clusters from the plurality of attributes, the plurality of clusters including varying numbers of the plurality of attributes; performing measurements on each of the plurality of clusters to generate measurement data values for each of the plurality of clusters; and selecting a cluster with a greatest measurement data value. In some embodiments, the method may include receiving a data set from a data source; identifying attributes included in the selected cluster and sorting the data set based on the attributes. The data set may include counter data corresponding to a number of conversions. Sorting the data set may further include generating strata within the data set as a function of the attributes wherein each stratum within the strata corresponds to one of the attributes. The step of generating strata may include computing a metric for each of the stratum. In some embodiments, the metric is a conversion rate. In addition, the method may include applying a weight to each of the stratum data to generate weighted stratum data, the weight being a percentage of a total data set represented by the data set. The sum of the weighted stratum data and for the total data set using the sum may also be computed. A metric for the data using the sum may also be computed and a comparison of the metric for the data set to the metric for the total data set may be used to determine a quality of the data set.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
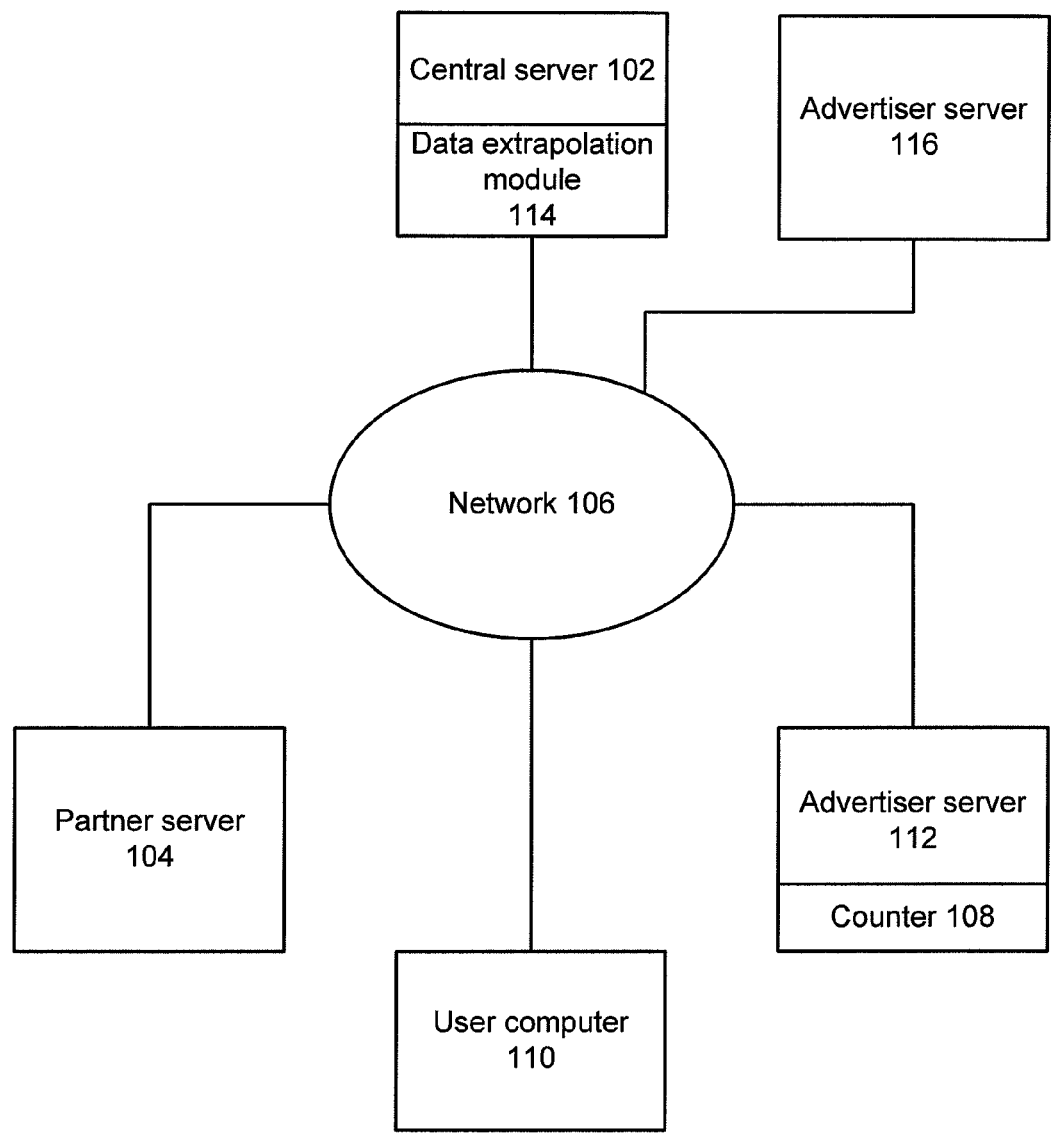
FIG. 1 illustrates a system for extrapolating data from a biased sample set according to one embodiment of the present invention.

FIG. 1 illustrates a system for extrapolating data from a biased sample set according an exemplary embodiment of the present invention. The system may comprise a central server 102, a plurality of partner servers 104 and one or more user computers 110, which are communicatively interconnected via a communications network 106. According to embodiments of the invention, the communications network 106 may comprise a wired/wireless Local Area Network / Wide Area Network ("LAN/WAN"), a cellular network, the Internet, an intranet, a Virtual Private Network ("VPN"), a Public Switched Telephone Network ("PSTN"), etc.

The central server 102, the partner servers 104 and the user computer 110 may be programmable processor-based computing devices that include persistent and transient memory, as well as one or more network connection ports for transmitting and receiving data on the network 106. Both the central server 102 and the partner servers 104 may host websites, store data, serve ads, etc. The user computer 110 may be, for example, a Personal Computer ("PC"), a laptop, a cell phone, a Personal Digital Assistant ("PDA"), a smart appliance, etc. that utilizes a network interface (e.g., a web browser, a command line interface) for communicating with various other devices on the network 106. Those of skill in the art understand that any number and type of central server 102, partner servers 102 and user computer 110 may be connected to the network 106.

The central server 102 may be utilized by a company which creates and manages advertising campaigns for advertisers, e.g., an advertisement provider. For example, the company may serve an advertisement campaign in which advertisements for advertised products or services are served to the user computer 110 when the user computer 110 accesses different websites on the network 106, such as a partner web site. According to one embodiment, the central server 102 publishes links to the advertiser website on the partner websites. For example, where the central server 102 is serving an advertisement for a product or service to a partner web site and the user computer 110 transmits a HyperText Transmission Protocol ("HTTP") request to the partner web site, the partner server 104 may transmit the webpage with an advertisement for the product or service from the central server 102.

When a user clicks on an advertisement on the page that partner web site provides, the user may be redirected to a web site for the advertiser, e.g., a web page that allows the user to purchase the advertised product or service. When the advertiser server 112 provides the page to the user computer 110, a user utilizing the user computer 110 may take an action that the advertiser server 112 identifies as a conversion. When a user performs an action that the advertiser server 112 identifies as a conversion, a counter 108 at the advertiser server 112 may log (or send a packet up to the central server 102 signaling) a conversion. The conversion may be compiled into counter data (along with, e.g., timestamps, IP addresses, etc.) and transmitted to the central server 102 for analysis. According to one embodiment, the central server 102 generates a progress report for a campaign by comparing the counter data to goals or benchmarks set forth for the campaign, as compared to other campaigns, as compared to other companies generating ad campaigns, etc. The progress report may allow the advertiser (or the central server 102) to calculate a return-on-investment ("ROI").

The central server 102 may extrapolate data from the counter data which is representative of an entire advertiser population serviced by the central server 102. According to one embodiment, a data extrapolation module 114 at the central server 102 may track the conversions for the campaigns which utilize the counters 108 and accurately determine the conversion rate for the entire population. Some advertiser servers 116, however, may not utilize link publication as an avenue of advertising their products or services, but rely on other avenues such as, for example, pop-up ads, keyword identification, etc. Similarly, some advertiser servers 116 may not utilize a counter 108 as described herein, or choose not to share these data with the central server 102 providing the advertisements to partner sites. According to the exemplary embodiments of the present invention, the counter data may be normalized and used to extrapolate data for calculating metrics for the entire advertiser population. Thus, the data extrapolation module 112 at the central server 102 may use the counter data to determine a quality of traffic across one or more avenues of advertising utilized by the central server 102 in administering one or more campaigns.

Figure 2:
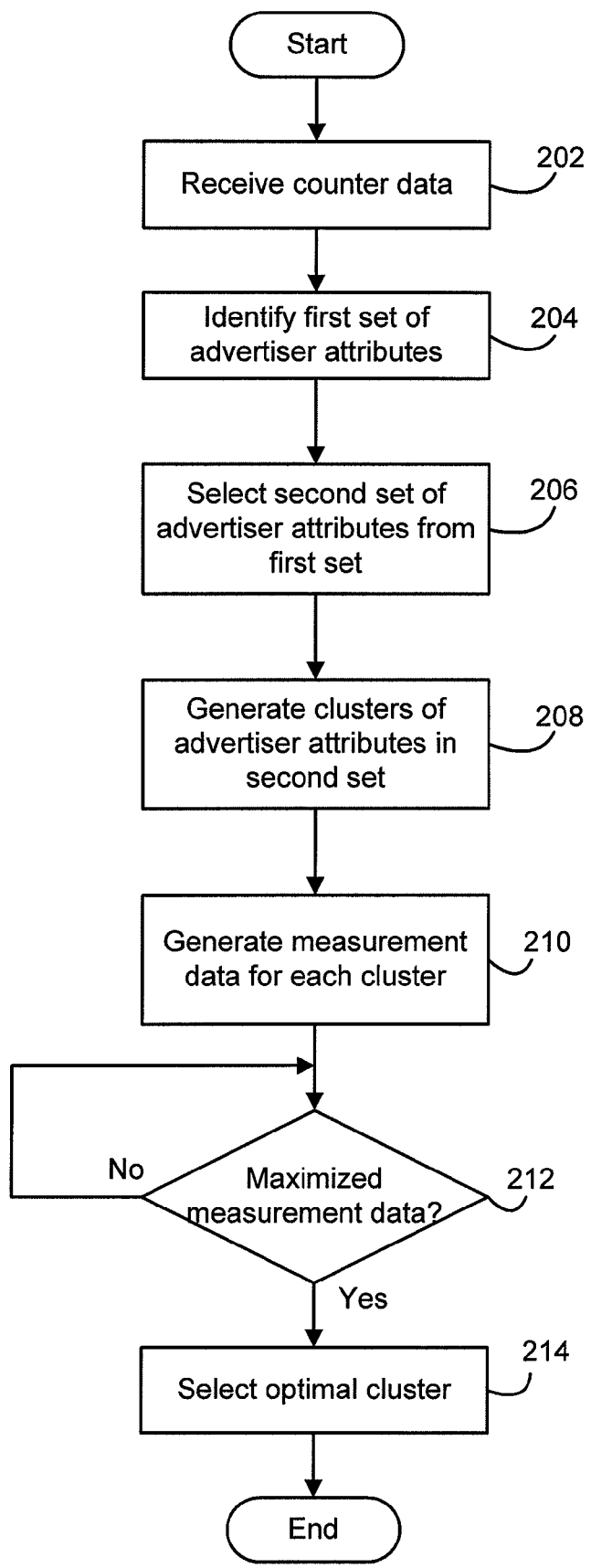
FIG. 2 illustrates a method for extrapolating data from a biased sample set according to one embodiment of the present invention.

FIG. 2 illustrates a method for extrapolating data from a biased sample set according to one embodiment of the present invention. In step 202, the central server receives the counter data from one or more advertisers. The advertisers may publish links to the products or services on the partner websites. When an HTTP request for data associated with a conversion is received by the advertiser server, the counter may log a conversion as the counter data. As described above, the counter data may further include, for example, an IP address associated with the HTTP request (e.g., of the user computer), an IP address of the partner server, a timestamp, or any other data that may be associated with the conversion.

Although the counter is shown as being located at the advertiser server, those of skill in the art understand that the counter (or multiple counters) may be located at the central server and process raw data transmitted by the partners servers 104 to generate the counter data. For example, the advertiser servers may simply detect the HTTP request for the conversion and generate raw data based thereon. The raw data may be transmitted (e.g., batch, synchronous, asynchronous) to the central server, which inputs the raw data to the counter (s) to generate the counter data. The advertiser server that is transmitting the raw data may attach an IP address associated with the HTTP request (e.g., of the user computer 110), an IP address of the partner server 104, a timestamp, etc. so that the central server 102 may associate the counter data with an advertiser and advertisement.

In step 204, a first set of advertiser attributes related to a traffic quality metric are identified. That is, the advertiser attributes may be related to the traffic quality metric in that they directly or indirectly influence computation of the traffic quality metric. The advertiser attributes may include, but are not limited to, a product/service category of the advertiser, a channel, a number of terms selected by the advertiser, a number of listing selected by the advertiser, a price-per-click, a number of clicks, a total cost to the advertiser, a duration of the advertiser's campaign(s), a tenure, a tier, a click through rate, etc. Thus, the central server may determine which of the advertiser attributes have an influence on the traffic quality metric and identify those advertiser attributes as belonging to the first set of advertiser attributes. Although the exemplary embodiments of the present invention will be described as the traffic quality metric being a conversion rate, those of skill in the art understand that the present invention may be utilized to extrapolate data related to an ROI value, an amount or quality of traffic from the partner servers, etc.

The advertiser attributes included in the first set of advertiser attributes may be manually or machine identified. For example, an individual may review a complete list of advertiser attributes and flag those which influence the conversion rate. Alternatively, the central server 102 may utilize an algorithm for computing the conversion rate and tag or otherwise identify those advertiser attributes which have the greatest influence on the conversion rate.

In step 206, a second set (also referred to as "a predictive set") of the advertiser attributes are selected from the first set. The predictive set includes the advertiser attributes which explain (or sufficiently estimate) one or more of the variances in the conversion rate for the counter data from one or more advertiser servers. To identify the advertiser attributes in the first set which are selected for inclusion in the second set, various combinations of the advertiser attributes may be generated and input to regression analysis techniques to determine whether a selected combination results in (or sufficiently estimates—e.g., using predefined bounds) the variance of the conversion rate. When the combination explains the variance of the conversion rate, a forward feature selection may then be utilized to select the advertiser attributes within the combination that explain the variance of the conversion rate. The selected advertiser attributes are included in the second set.

In step 208, clusters of advertiser attributes in the second set are generated. A given one of the clusters may include a plurality of advertiser attributes selected from the second set, creating clusters in multiple dimensions. For example, if the second set contains ten advertiser attributes, the clusters may include as few as two advertiser attributes and as many as ten attributes.

In step 210, measurement data is generated for one or more of the clusters. The measurement data may include, but is not limited to, an analysis of variance ("ANOVA") score (e.g., an F-score), a mean-square-error ("MSE") value, a parsimony minimization value, a standard deviation, a coefficient of variation, etc.

In step 212, the measurement data for one or more of the clusters is compared to determine the given clusters that is associated with maximized measurement data. The maximized measurement data may be represented as a least MSE value or a widest segment margin (as determined from the F-score).

In another exemplary embodiment, a portion of the measurement data may be calculated for one or more of the clusters to identify the clusters for which the remaining measurement data should be calculated. For example, the F-score may be calculated for one or more of the clusters and used to identify the clusters for which the MSE value, the parsimony minimization value, the standard deviation, the coefficient of variation, etc. should be calculated. As understood by those of skill in the art, this exemplary embodiment may limit processing time or cycles by discarding the clusters based on the F-scores, thereby limiting a number of clusters for which the remaining measurement data is calculated.

In step 214, a cluster (e.g., an optimal cluster) is selected that maximizes the measurement data. The advertiser attributes contained in the optimal cluster ("optimal advertiser attributes") are those that are most closely related to (e.g., predict) the variances in the conversion rate.

Figure 3:
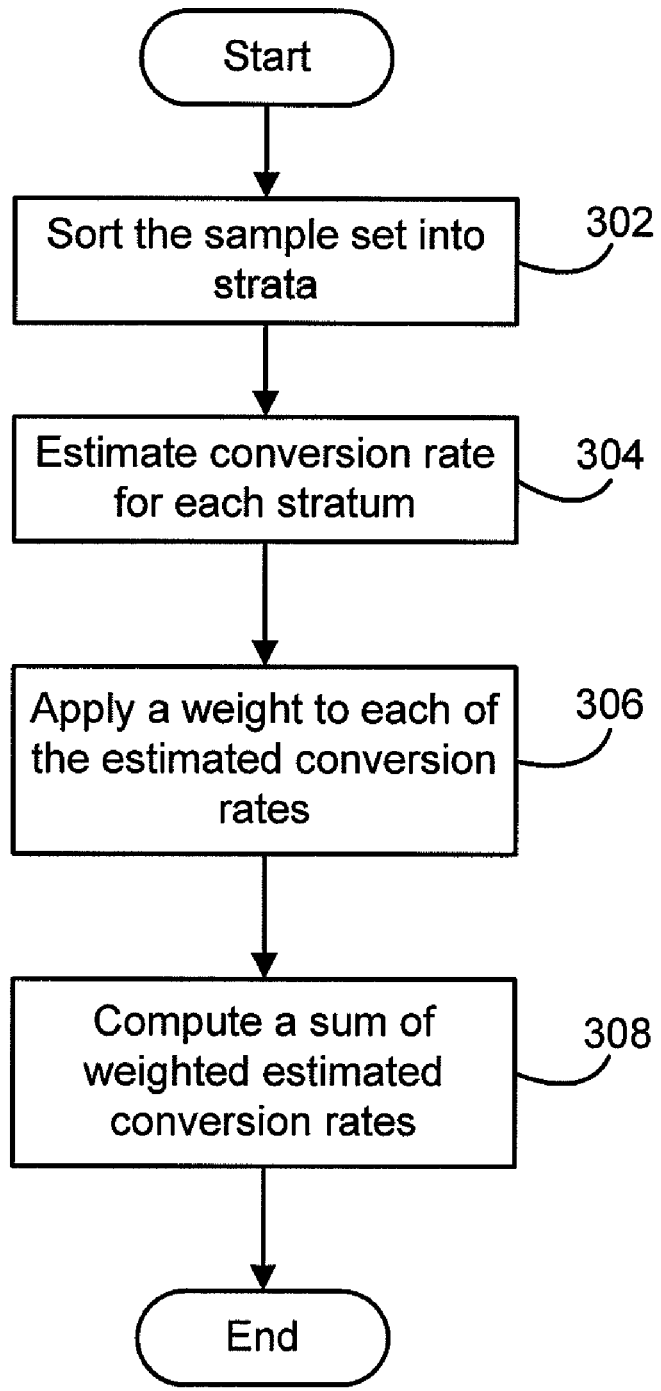
FIG. 3 illustrates a method for extrapolating data from a biased sample set using preselected attributes according to one embodiment of the present invention.

FIG. 3 illustrates one embodiment of a method for extrapolating data from a biased sample set using the advertiser attributes. In the exemplary embodiment, a stratified sampling approach is utilized to mitigate a bias in the sample set of counter data. In step 302, the sample set is sorted into strata based on the optimal advertiser attributes associated with the optimal cluster. The sample set, for example, may be the counter data received from the counter at the advertiser server. As described, above, the sample set is biased such that any use, analysis, etc. thereof without mitigating or otherwise eliminating the bias may produce inaccurate results.

A given stratum represents a homogenous segment of the sample set. A homogenous segment to sample set may be a segment of a sample (advertiser) set such that the conversion rate of the advertisers that belong to the segment is more homogenous (uniform) than other such possible segments of the sample. According to one embodiment, homogeneity is minimized among different segments to produce the least number of possible segments. In step 304, an estimated conversion rate is computed for a one or more stratum. The conversion rate of each stratum may be computed as the average conversion rate of advertisers that belong to a given stratum or segment.

In step 306, a weight is applied to each of the estimated conversion rates. The weight may be proportional to the percentage of the total clicks/revenue that the stratum represents. Alternatively, the weight may be proportional to a percentage of the entire advertiser population that is associated with the one or more advertisers that produced the counter data comprising the sample set. Application of the weight ensures that extrapolation errors are limited within each stratum. Thus, the strata are free from the bias of the sample set.

In step 308, a sum of the weighted estimated conversions rates is computed to identify a conversion rate associated with the population of advertisers. By mitigating or otherwise eliminating the bias in the sample set, the sum represents an accurate estimation of the conversion rate for the population of advertisers.

When the conversion rate associated with the population is determined, the quality of traffic got a given one of the advertiser servers may be analyzed. That is, the conversion rates for the advertisers may be recalculated using the conversion rate for the entire population. The recalculated conversion rates may be compared to the conversion rate for the entire population to determine an objective quality of traffic.

FIGS. 1 through 3 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method, comprising:
   identifying a plurality of attributes corresponding to an advertisement;
   electronically generating a plurality of clusters comprising the plurality of attributes, the plurality of clusters including varying numbers of the plurality of attributes;
   electronically performing measurements on each of the plurality of clusters to generate measurement data values for each of the plurality of clusters; and
   selecting an optimal cluster associated with a plurality of maximized measurement data, from the generated measurement data values, represented as a mean-square error value, the optimal cluster including one or more advertiser attributes from the plurality of attributes, the advertiser attributes in the optimal cluster being the most predictive of a variance of a conversion rate from the plurality of attributes.

2. The method according to claim 1, comprising receiving a data set from a data source.

3. The method according to claim 2, comprising:
   identifying attributes included in the selected optimal cluster; and
   sorting the data set based on the identified attributes.

4. The method according to claim 2, wherein the data set comprises counter data corresponding to a number of conversions.

5. The method according to claim 3, wherein the sorting comprises generating a strata within the data set as a function of the identified attributes, the strata including a plurality of stratum.

6. The method according to claim 5, wherein each one of the plurality of stratum within the strata corresponds to one of the identified attributes.

7. The method according to claim 5, comprising computing a metric for each one of the plurality of stratum to generate stratum data.

8. The method according to claim 7, wherein the metric is the conversation rate.

9. The method according to claim 7, comprising applying a weight to each of the stratum data to generate weighted stratum data, the weight being a percentage of a total data set represented by the data set.

10. The method according to claim 9, comprising:
    computing a sum of the weighted stratum data; and
    computing the metric for the total data set using the sum.

11. The method according to claim 10, comprising:
    computing the metric for the data set using the sum; and
    comparing the metric for the data set to the metric for the total data set to determine a quality of the data set.

* * * * *